May 22, 1962     T. H. PEIRCE     3,035,799
MOUNTING
Filed June 22, 1959     2 Sheets-Sheet 1
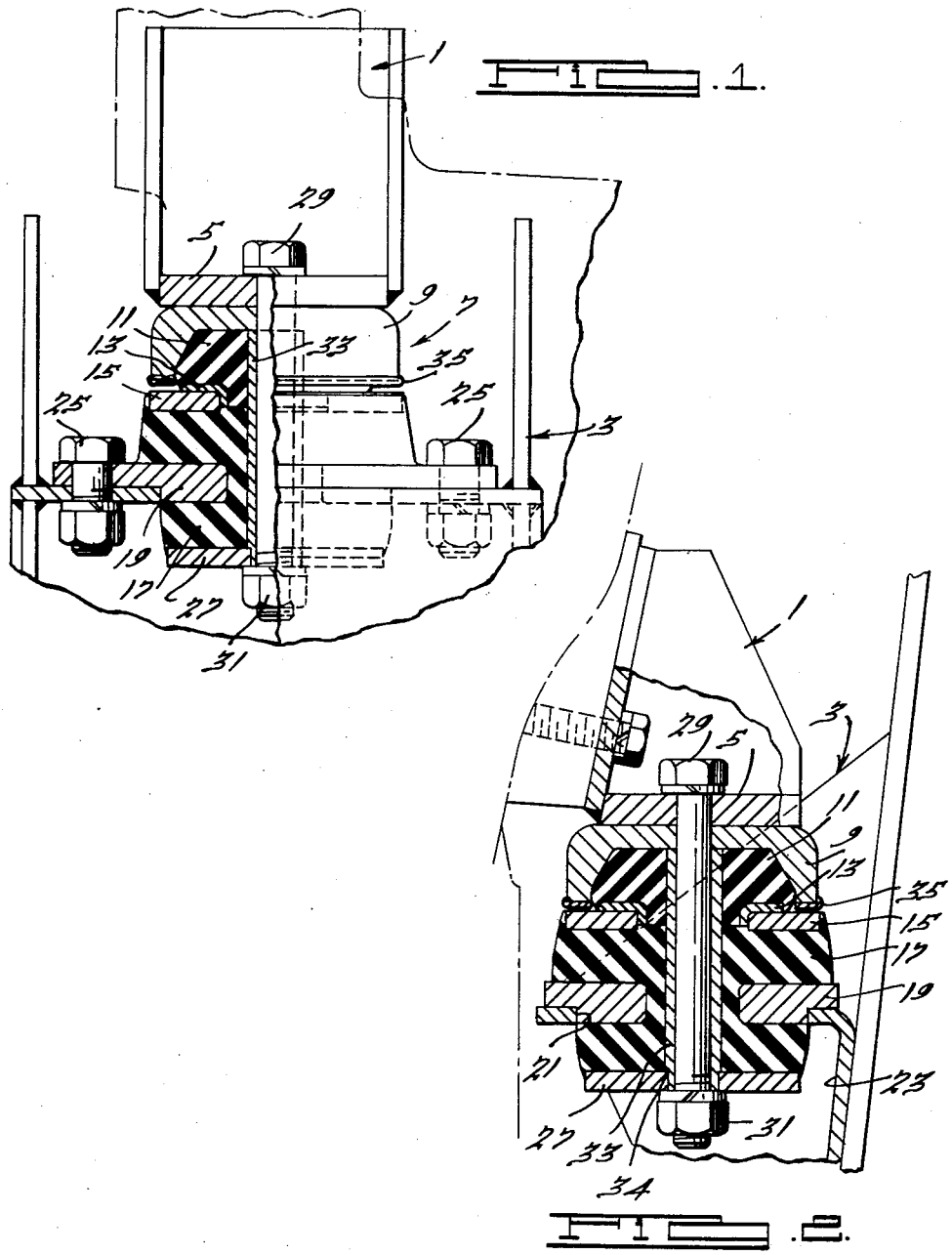
INVENTOR.
Thomas H. Peirce.
BY
Harness, Dickey & Pierce
ATTORNEYS May 22, 1962
T. H. PEIRCE
3,035,799
MOUNTING
Filed June 22, 1959
2 Sheets-Sheet 2
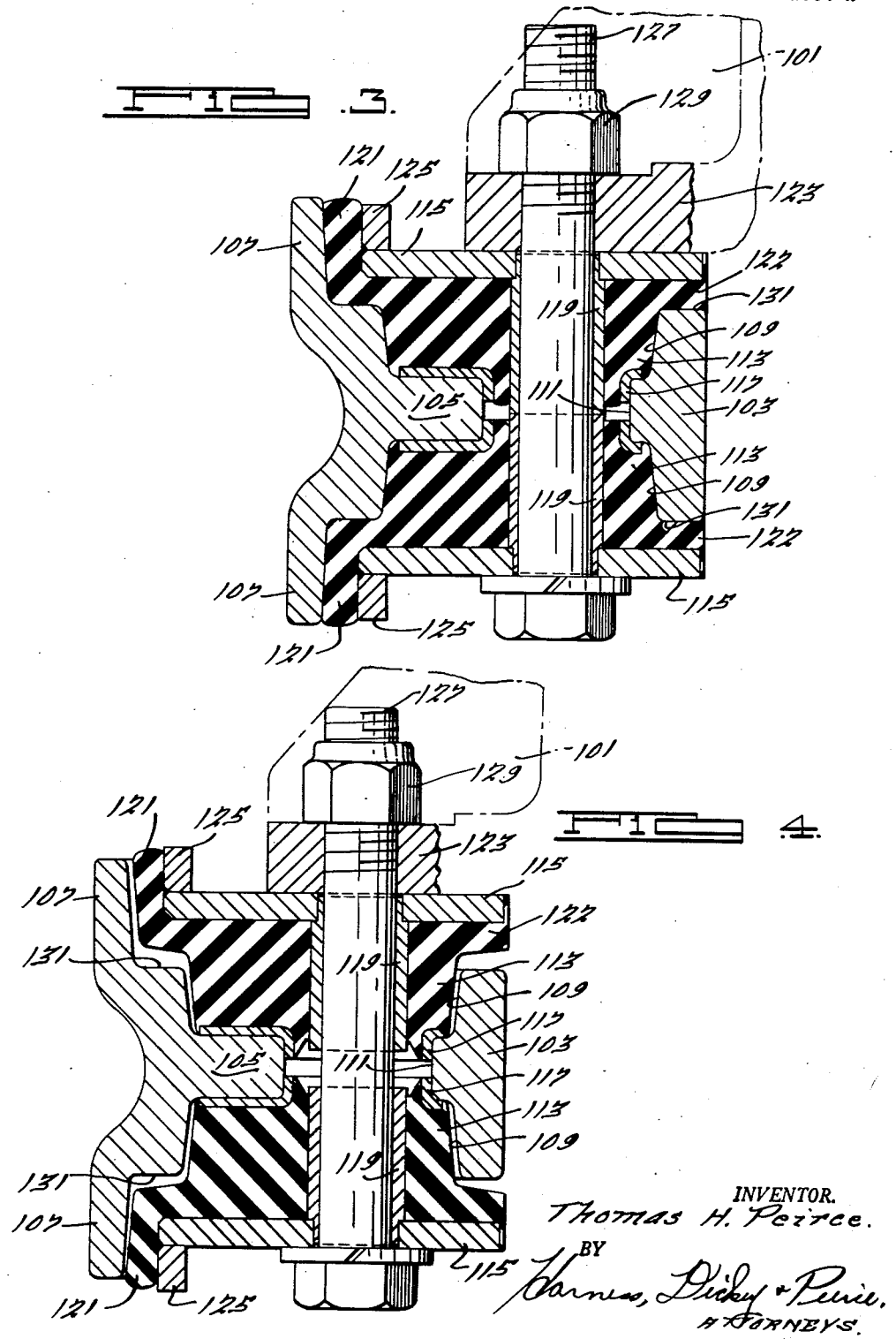
INVENTOR.
Thomas H. Peirce.
BY
Barnes, Dickey & Pierce.
ATTORNEYS.

United States Patent Office 3,035,799
Patented May 22, 1962

3,035,799
MOUNTING
Thomas H. Peirce, 16725 Shaftsbury, Detroit 19, Mich.
Filed June 22, 1959, Ser. No. 821,888
5 Claims. (Cl. 248—15)

My invention relates to flexible mountings, and, in particular, my invention concerns a mounting that is well adapted to support heavy loads that are subjected to heavy dynamic loading.

In many applications of heavy machinery or heavy mobile equipment there are parts which are subjected to a certain average load throughout a large percentage of their operation but which, at times, are subjected to extremely heavy loads. Illustrations of this are engines or other heavy parts in trucks, bulldozers, tanks, and the like. In the past, difficulty has been encountered because the resilient or flexible mountings employed for certain of these heavy parts have been noted by an extremely short life when the equipment is subjected to vigorous usage.

It is therefore an object of my invention to provide a mounting of a resilient nature which is capable of absorbing the ordinary static loads to which heavy parts are subjected, as well as the much larger dynamic loads to which they are occasionally subjected.

My invention achieves the foregoing purpose and accomplishes other objects which will be apparent hereinafter by means of a construction in which a body of rubber is used to resiliently or flexibly support the heavy part which is subjected to the various loadings. This body of rubber and the associated parts of the mounting are so constructed that only a portion of the body of rubber is utilized to support the weight of the part during the normal usage. However, in the event of abnormally high loads, such as accompany shocks or dynamic loading, the remaining part of the rubber body will come into action to furnish stiffness and support for the part against the heavier loads.

My invention is illustrated in the accompanying drawings in which:

FIG. 1 is a side elevation partly in section of one form of the invention showing it under static load;

FIG. 2 is a side elevation taken from one side of the view of FIG. 1 showing the structure of FIG. 1;

FIG. 3 is a cross section through another form of the invention showing it under static load; and FIG. 4 is a view similar to FIG. 3 but showing the parts prior to static load.

Referring to the embodiment of FIGS. 1 and 2, reference numeral 1 is used to indicate a portion of a part to be resiliently mounted, such as the engine of a truck or tank, while numeral 3 illustrates the frame on which the part 1 is to be mounted. The load of the part 1 is transferred by a bottom pad 5 thereof into the mounting 7 which is constructed in accordance with the principles of my invention.

The mounting 7 has a top cap 9 on which the pad 5 rests to transmit the weight and the load of the part 1 into the mounting 7. Static or normal low dynamic loads are transmitted by the cap 9 into a conical body of relatively soft rubber 11 which is contained within the cavity of the cap 9. The load in the rubber 11 is transmitted through its bottom retainer plate 13, to which the rubber is bonded, into a top plate 15. The top plate 15 is bonded to the top of a relatively hard body of rubber 17. The load in the rubber 17 is transmitted to the mounting plate 19 which is bonded to a central or intermediate portion of the rubber body 17. The plate 19 is in the form of a flange which fits in a suitable opening 21 on a bracket 23 forming a part of the frame 3. The plate 19 may be rigidly secured to the bracket 23 by means of bolts 25 as seen in FIG. 1. The body of rubber 17 has a portion located on the bottom of the plate 19 and its bottom face is covered by the metal plate 27.

A bolt 29 extends through aligned apertures in the pad 5, the cap 9, and the bottom plate 27 and is secured tightly against the bottom plate 27 by means of a nut 31, in order to impose an axial preload so as to compress the rubber, especially that between plates 19 and 27. The bolt 29, within the rubber bodies 11 and 17, extends through a spacer tube 33 which is bonded to the lower rubber body 17 and has a shoulder 34 engaging the top of plate 27. It will be noted that the internal diameters of the plates 15 and 19, as well as the retainer element 13, through which the tube 33 extends, are substantially larger than the outer diameter of the tube 33 so that there is a substantial thickness of rubber in these openings. The bottom of cap 9 is rubber coated as shown at 35.

In use, the static weight of the engine or other part 1 is carried resiliently by the relatively soft rubber body 11 which deforms to cushion the low loads that may occur, the conical shape providing a slight increase in rate with deflection. In the event that a shock load or higher load should occur, the bottom face 35 of the cap 9 will contact the top plate 15 of the rubber body 17 and the load will be transmitted directly from the cap 9 into the body 17 so that it will act in parallel with rubber body 11. The tube 33 will force plate 27 away from plate 19 to overcome a part of the compression preload in the rubber between plates 19 and 27. The rubber body 17 is of substantially greater hardness, stiffness, and volume than the rubber body 11 and will therefore serve to properly dampen heavier loads without being subjected to rapid deterioration.

The portion of the rubber body 17 below the plate 19 will act to absorb rebounds in the event that there are up loads on the bolt 29. Because of the clearances provided between the cap 9 and the plate 15, as well as the clearance between the tube 33 and the plates 13, 15 and 19, a certain amount of angular or nonaxial movement of the part 1 relative to the part 3 can be accommodated. Also, rotary movement about the axis of the bolt 29 can be accommodated.

Apart from the bolt 29 and nut 31 it will be observed that the present mounting comprises only three pieces that must be assembled. One of these is the cap 9. The other is the body of rubber 11 and the retainer 13 which are bonded to each other. The third is the bonded assembly of rubber body 17, plates 15, 19, and 27, along with the center tube 33.

Whereas the mountings shown in FIGS. 1 and 2 are substantially cylindrical or symmetrical about the axis of the bolt 29, the modified form shown in FIGS. 3 and 4 is of substantially rectangular configuration. The weight of the engine or other part to be resiliently mounted, identified by the reference numeral 101, is transmitted through the mounting into the bracket element 103 which is suitably adapted by means that are not shown in the drawings to be rigidly connected to the frame or other stationary part with respect to which the element 101 is intended to have relative movement. The bracket 103 is symmetrical about a transverse center section 105 and thus has upper and lower vertical flanges 107 and upper and lower tapered, rectangular cavities 109 which are connected by a central cylindrical cavity 111. The inside faces of the flanges 107 are preferably tapered on a slight angle as is evident in the drawings.

Seated in each cavity 109 is a four-part assembly which comprises a rubber body 113, a plate 115, a retainer stamping 117, and a center tube 119, the metal parts 115, 117, and 119 being bonded to the faces of the rubber elements 113. The rubber body 113 also has a flange section 121 which is adapted to engage the flange 107 and a flange section 122 engaged by and bonded to plate 115. As can be seen, the plate member 115 on the top rubber assembly is engaged by the bottom of the pad 123 on the engine 101 and the retainer 117 fits in the opening 111 of the bracket 103. Each of the plates 115 has a flange 125 which engages the opposite side of the rubber flange 121 to confine it in a tapered cavity. A bolt 127 extends through plates 115, pad 123, and 119 and is tightened by a nut 129.

In the unloaded position of the parts as shown in FIG. 4, it will be seen that there is a clearance between the rubber bodies and the surfaces 109 and 107 and the shoulders 131. At assembly the static weight of the engine 101 compresses the top rubber body to the position of FIG. 3 and the nut 129 is tightened so that the bottom rubber body is compressed to the FIG. 3 position, preferably slightly more than the compression of the upper body due to static load. The extent of compression is controlled by engagement of spacer sleeves 119. The compression due to static load and tightening of bolt 127 is such that the rubber just lightly contacts surfaces 109, flanges 107, and surfaces 131 so that the static load is carried almost entirely by the center portions of the rubber bodies in engagement with the section 105. This has the effect of making the rubber rather soft under normally static conditions. However, as the force applied to the mounting increases, one or the other of the rubber bodies will radially compress against the surface 109 and the surface 131 so that the resistance to further deformation increases markedly as the side and the flange come into contact and the rubber in effect becomes a good deal harder or of a higher rate. The flanges 121 act to absorb up and down loads as well as side loads. The loads due to the shock conditions or dynamic loading are thus transmitted through the surfaces 109 and 131 as well as directly into the section 105 and into the frame.

It will now be appreciated that the principles of my invention may be embodied in structure other than those specifically illustrated and described.

I claim:

1. A resilient mounting to resiliently interconnect a first part to a second part comprising a static load bearing portion and a dynamic load bearing portion, said static load portion comprising a rubber body having a conical load receiving surface and a flat load transmitting surface, a conical load member engaging said conical surface, said dynamic load bearing portion comprising a second rubber body having a top load receiving member in alignment with said conical loading member and spaced from it during static loading but in abutment with it to receive load therefrom during dynamic loading, a member engaging the bottom of said second rubber body and bonded to it, means precompressing a portion of said second rubber body, and means providing for elongation and a lessening of precompression in said precompressed portion of said second rubber body during dynamic loading.

2. A resilient mounting comprising a cap having a recess, a rubber body having a retainer bonded to its bottom and a top to fit in the recess, a second rubber body having plates bonded to its top and bottom and a central plate bonded to a central portion, said three plates being parallel, said rubber bodies and plates having aligned openings, a center tube in said openings extending at right angles to said plates and bonded to said second rubber body, said cap being engageable with said top plate.

3. A resilient mounting comprising a load applying member and a load receiving member, a rubber body between said members and continuously engaging them respectively on its top and bottom faces, said load receiving member having a side surface spaced from the periphery of the body by a distance such that only after predetermined movement of said members toward each other said rubber body periphery is compressed against said surface, said rubber body having a flange precompressed between the sides of said members after predetermined movement of one toward the other.

4. A resilient mounting comprising a load applying member and a load receiving member, a rubber body between said members and continuously engaging them respectively on its top and bottom faces, said load receiving member having a side surface spaced from the periphery of the body by a distance such that only after predetermined movement of said members toward each other said rubber body periphery is compressed against said surface, said rubber body having a flange extending parallel to the direction of movement of one member toward the other and adapted to absorb loads that are transverse to said direction of movement.

5. The invention set forth in claim 4 wherein said flange is located between said members and spaced from one of them until predetermined movement of said members toward each other has occurred.

References Cited in the file of this patent

UNITED STATES PATENTS

| | | |
|---|---|---|
| 2,037,033 | Lord | Apr. 14, 1936 |
| 2,457,058 | Markowitz | Dec. 21, 1948 |
| 2,641,434 | Henshaw | June 9, 1953 |
| 2,678,796 | Roy | May 18, 1954 |
| 2,755,056 | Hutton | July 17, 1956 |
| 2,783,959 | Boschi et al. | Mar. 5, 1957 |
| 2,890,846 | Schloss | June 16, 1959 |
| 2,911,207 | Coble | Nov. 3, 1959 |
| 2,941,766 | Van Ranst | June 21, 1960 |